(12) United States Patent
Tsuchiya et al.

(10) Patent No.: US 11,137,023 B2
(45) Date of Patent: Oct. 5, 2021

(54) ROLLER AND CAGE ASSEMBLY AND PLANETARY GEAR SUPPORT STRUCTURE

(71) Applicant: NTN CORPORATION, Osaka (JP)

(72) Inventors: Masaru Tsuchiya, Shizuoka (JP); Rino Fukami, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/954,624

(22) PCT Filed: Dec. 28, 2018

(86) PCT No.: PCT/JP2018/048474
§ 371 (c)(1),
(2) Date: Jun. 17, 2020

(87) PCT Pub. No.: WO2019/138937
PCT Pub. Date: Jul. 18, 2019

(65) Prior Publication Data
US 2020/0362911 A1 Nov. 19, 2020

(30) Foreign Application Priority Data
Jan. 9, 2018 (JP) .............................. JP2018-001389

(51) Int. Cl.
*F16C 33/46* (2006.01)
*F16H 57/08* (2006.01)
(Continued)

(52) U.S. Cl.
CPC ............ *F16C 19/34* (2013.01); *F16C 33/467* (2013.01); *F16H 1/28* (2013.01); *F16H 57/08* (2013.01);
(Continued)

(58) Field of Classification Search
CPC ...... F16C 19/34; F16C 33/467; F16C 33/541; F16C 33/4682; F16C 33/4676;
(Continued)

(56) References Cited

U.S. PATENT DOCUMENTS 3,114,960 A * 12/1963 Einaudi ................... F16C 33/46
29/898.067
3,494,684 A * 2/1970 Benson ............... F16C 33/4676
384/580
(Continued)

FOREIGN PATENT DOCUMENTS

JP 08-312650 11/1996
JP 2006-046391 2/2006
(Continued)

*Primary Examiner* — Tisha D Lewis
(74) *Attorney, Agent, or Firm* — Clark & Brody LP

(57) ABSTRACT

A roller and cage assembly (1) includes a roller (2) and a cage (3). The cage has a plurality of annular portions (30), a plurality of pillars (31) that couple the plurality of annular portions, and a pocket (40) formed between adjacent pillars. The pillars include a protrusion (35) that protrudes from a side wall surface towards the pocket and contacts the roller, which side wall surface configures the pocket, and within the protrusion, a plane facing the roller in a circumferential direction has a first plane (36), and a second plane (37) connecting to the first plane, the first plane being a flat plane, and the second plane being a curved plane, or a flat plane inclined against the first plane.

6 Claims, 6 Drawing Sheets

(51) Int. Cl.
*F16C 19/34* (2006.01)
*F16H 1/28* (2006.01)

(52) U.S. Cl.
CPC .... *F16C 2361/61* (2013.01); *F16H 2057/085* (2013.01)

(58) Field of Classification Search
CPC ........ F16C 2361/61; F16H 1/28; F16H 57/08; F16H 2057/085
See application file for complete search history.

(56) References Cited

U.S. PATENT DOCUMENTS

| | | | | |
|---|---|---|---|---|
| 3,582,165 A | * | 6/1971 | Koch | F16C 33/4623 |
| | | | | 384/580 |
| 5,584,583 A | * | 12/1996 | Hidano | F16C 19/463 |
| | | | | 384/470 |
| 5,647,674 A | * | 7/1997 | Ohashi | F16C 33/543 |
| | | | | 384/580 |
| 5,795,080 A | * | 8/1998 | Fujiwara | F16C 19/463 |
| | | | | 384/580 |
| 6,648,519 B2 | * | 11/2003 | Fugel | B21D 53/12 |
| | | | | 384/575 |
| 8,322,931 B2 | * | 12/2012 | Urakami | F16C 19/463 |
| | | | | 384/580 |

FOREIGN PATENT DOCUMENTS

| | | |
|---|---|---|
| JP | 2009-079674 | 4/2009 |
| JP | 2009-115300 | 5/2009 |
| JP | 2013-053698 | 3/2013 |

* cited by examiner

ROLLER AND CAGE ASSEMBLY AND PLANETARY GEAR SUPPORT STRUCTURE

TECHNICAL FIELD

The present invention relates to a roller and cage assembly and a planetary gear support structure.

BACKGROUND ART

It is traditionally known, with a needle roller and cage assembly, to devise the shape of the cage to prevent peeling from occurring on the roller caused by oil film breakdown. For example, a cage described in Patent Document 1 (Japanese Unexamined Patent Application Publication No. H8-312650) has a claw section that is rectangular shaped in top view for supporting the roller, and discloses that the roller is guided by a flat portion of the claw section.

In addition, a technique for preventing oil film breakdown caused by skewing is described in, for example, Patent Document 2 (Japanese Unexamined Patent Application Publication No. 2009-79674). Patent Document 2 discloses a roller bearing cage whose plane of a slip-off lock protrusion serving to prevent the slipping off of the roller, which plane contacts the roller, is formed as a curved surface. When the roller skews, the curved surface contacts the roller. This allows for preventing the oil film breakdown on an outer peripheral surface of the roller caused by striking at the edges, and can prevent abrasion of the cage and roller.

CITATION LIST

Patent Literatures

[Patent Document 1] Japanese Unexamined Patent Application Publication No. H8-312650
[Patent Document 2] Japanese Unexamined Patent Application Publication No. 2009-79674

SUMMARY OF INVENTION

Technical Problem

In the roller bearing cage of Patent Document 1, in the normal state in which the roller is not skewed, the roller and the curved surface of the cage assembly are in plane contact, so there is a low possibility that the roller and the cage abrade. However, in a state in which the roller is skewed, the roller contacts an edge portion of the claw section, which may cause the roller and the cage to abrade.

In the roller bearing cage of Patent Document 2, in the state in which the roller is skewed, the roller is in contact with a curved surface, so there is a low possibility that the roller and the cage abrade. However, in a normal contacting state in which the roller is not skewed, the roller and the curved surface of the cage are in point contact, which may thus cause the roller and the cage to abrade at the part at point contact and may cause peeling on the roller.

Moreover, in recent years, for example, for the fuel economy of automobiles, along with the reduction in the amount of lubrication oil used in the transmission, there are cases using lubrication oil with low kinetic viscosity. In these cases, the amount of lubrication oil is reduced in the roller and cage assembly, which causes difficulty in forming an oil film. This causes the cage and the roller to directly contact each other without an oil film intervening therebetween, and thus both the cage and the roller may abrade.

This invention is accomplished to resolve problems such as the above, and an object thereof is to provide a roller and cage assembly and a planetary gear support structure allowing for prolonging a lifetime thereof by preventing peeling from occurring.

Solution to Problem

A roller and cage assembly according to one aspect of the present invention includes a roller and a cage, wherein the cage has a plurality of annular portions, a plurality of pillars coupling the plurality of annular portions, and a pocket formed between adjacent ones of the pillars, the pillars include a protrusion protruding from a side wall surface toward the pocket and contacting the roller, the side wall surface configuring the pocket, within the protrusion, a plane facing the roller in a circumferential direction has a first plane, and a second plane connecting to the first plane, the first plane being a flat plane, and the second plane being a curved plane, or a flat plane inclined against the first plane.

Preferably, a border section where the first plane and the second plane meet is of a smooth arc form.

Preferably, the pillars include a pillar center portion located in a center region in an axial direction and relatively on an inner side in a radial direction, a pair of pillar end portions located on end regions in the axial direction and relatively on an outer side in the radial direction, and a pair of pillar inclined portions located between the pillar center portion and the pair of pillar end portions, the pillar end portions have a groove formed on an outer radial plane thereof configured to guide lubrication oil to the protrusion.

Preferably, a side end portion on the outer radial plane of the protrusion and the groove are in a positional relationship intersecting with each other.

Preferably, the roller has a crowning portion formed on each end thereof in the axial direction, the protrusion is provided having intervals therebetween in the axial direction, and the crowning portion is supported by an inclined flat plane of the first plane or the second plane.

A planetary gear support structure according to one aspect of the present invention includes: an internal gear; a sun gear disposed in a center of the internal gear; a plurality of planetary gears configured to mesh with the internal gear and the sun gear; and a carrier configured to support the planetary gear, wherein in the planetary gear support structure of a planetary gear mechanism in which the planetary gear is supported freely rotatable on a pinion shaft provided to the carrier via a rolling-element bearing, the rolling-element bearing is a roller and cage assembly described above.

Advantageous Effects of Invention

According to the present invention, it is possible to provide a roller and cage assembly and a planetary gear support structure allowing for prolonging a lifetime thereof by preventing peeling from occurring.

DESCRIPTION OF EMBODIMENTS

An embodiment of the present invention is described in detail with reference to the drawings. Identical or equivalent portions within the drawings will be provided with identical reference symbols, and their descriptions will not be repeated.

Overview of Planetary Gear Mechanism

Figure 1:
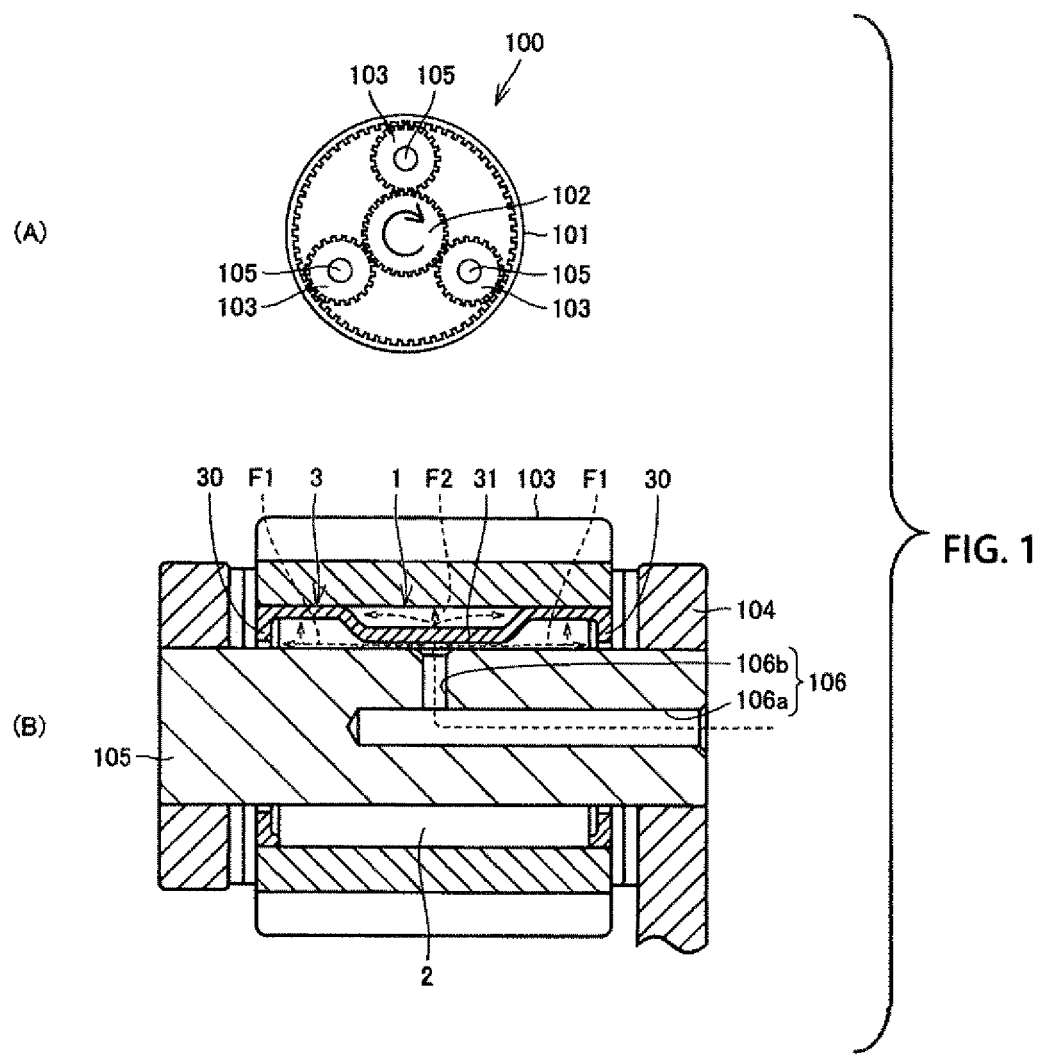
FIG. 1 is a view showing a state of a roller and cage assembly according to Embodiment 1 of the present invention being used in a planetary gear mechanism; (A) is a schematic view of the planetary gear mechanism, and (B) is a cross-sectional view of the gear parts.

First described is an overview of a planetary gear mechanism (planetary gear) 100 in which a roller and cage assembly 1 according to the present embodiment is used, with reference to FIG. 1.

The planetary gear mechanism 100 is, for example, used in a transmission for an automobile, and the roller and cage assembly 1 is used as a rolling-element bearing to support a pinion gear (pinion shaft) 103 in the planetary gear mechanism 100 in a rotatable manner. Namely, the roller and cage assembly 1 according to the present embodiment is a roller and cage assembly for automobiles.

The planetary gear mechanism 100 includes a ring gear (internal gear) 101 having inner teeth and which encircles an outer periphery, a sun gear 102 having external teeth and which is disposed at the center of the ring gear 101, and a plurality of pinion gears (planetary gears) 103 having external teeth and which are disposed between the ring gear 101 and the sun gear 102. The pinion gears 103 mesh with the ring gear 101 and the sun gear 102, and are supported in a rotatable manner to a pinion shaft 105 set in an engagement hole, by the roller and cage assembly 1. Each of the pinion shafts 105 are disposed (coupled) to a carrier 104, and rotations equivalent to the revolution of the pinion gears 103 are inputted to and outputted from the carrier 104.

With reference to FIG. 1(B), each pinion gear 103 is supported on the pinion shaft 105 in a rotatable manner via the roller and cage assembly 1 according to the present embodiment. That is to say, the roller and cage assembly 1 supports the pinion gear 103 on the pinion shaft 105 in a rotatable manner, and a planetary gear support structure includes the pinion gear 103, the pinion shaft 105, and the roller and cage assembly 1. More specifically, the roller and cage assembly 1 is, for example, configured by a plurality of rollers 2 and cages 3, in which an outer peripheral surface of the pinion shaft 105 serves as an inner raceway surface, and an inner peripheral surface of the pinion gear 103 serves as an outer raceway surface. The cage 3 of the present embodiment is used in an outer ring guiding form.

An oil passage hole 106 for feeding lubrication oil is formed inside the pinion shaft 105. By guiding the lubrication oil to the outer peripheral surface of the pinion shaft 105 via the oil passage hole 106 formed inside the pinion shaft 105 as such, the roller 2 becomes lubricated. More specifically, the oil passage hole 106 includes a first oil passage hole 106a extending in an axial direction from the right side shown in FIG. 1, and a second oil passage hole 106b that communicates with the outer peripheral surface around midway in the axial direction of the pinion shaft 105. The lubrication oil fed from the oil passage holes 106a, 106b of the pinion shaft 105 flows outwards toward both sides in the axial direction of the cage 3 as shown by the arrows F1 in FIG. 1(B), through a space between an inner periphery of an annular portion 30 of the cage 3 and the outer periphery of the pinion shaft 105. Moreover, similarly, the lubrication oil fed from the oil passage holes 106a, 106b of the pinion shaft 105 passes through a gap between a pillar 31 and the roller 2, and lubricates the outer peripheral surface of the roller 2, as shown by the arrows F2 in FIG. 1(B).

When the planetary gear mechanism 100 is used in a transmission for an automobile whose stages are increasing in number, the amount of lubrication oil fed to the roller and cage assembly 1 may be reduced, or lubrication oil with low viscosity may be fed, to further increase the fuel economy of the automobile. Kinematic viscosity of the lubrication oil is, for example, 2 centistokes (cSt) to 8 centistokes (cSt) at 100° C.

Embodiment 1

Figure 2:
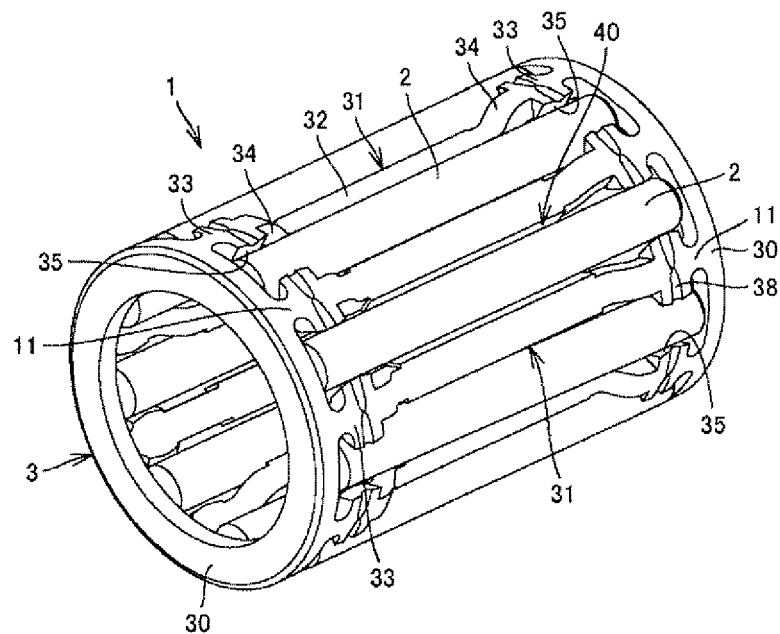
FIG. 2 is a perspective view showing the roller and cage assembly according to Embodiment 1 of the present invention.
Figure 3:
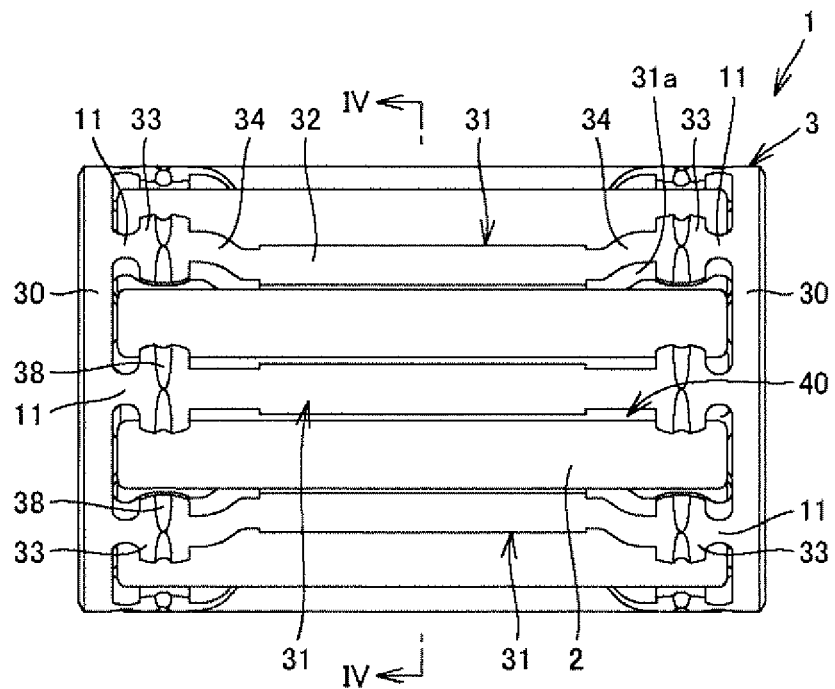
FIG. 3 is a plan view showing the roller and cage assembly according to Embodiment 1 of the present invention.
Figure 4:
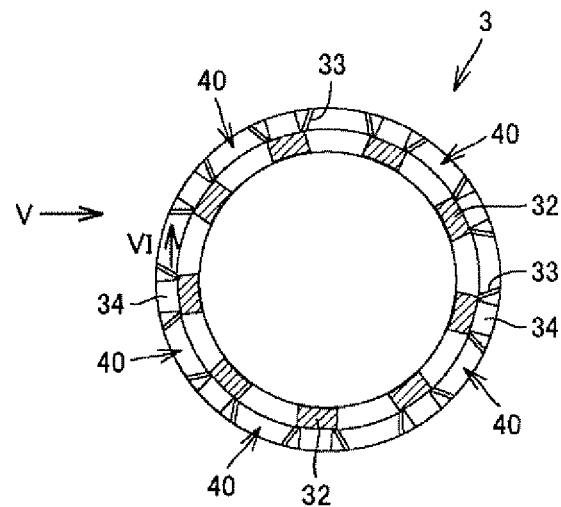
FIG. 4 is a cross-sectional view taken along line IV-IV in FIG. 3, and is a view showing just the cage in Embodiment 1, with the roller removed.

Next describes the roller and cage assembly 1 according to the present embodiment, with reference to FIGS. 2 to 4. The roller and cage assembly 1 includes a plurality of rollers 2, and a cage 3 made of metal for supporting the rollers 2. The rollers 2 of the present embodiment are needle rollers. The cage 3 has a plurality of annular portions 30, and a plurality of pillars 31 that couple the plurality of annular portions 30 to each other. The plurality of annular portions 30 are coaxially disposed. The plurality of annular portions 30 and pillars 31 are coupled via waist portions 11 narrower than a length of the pillars 31 in a circumferential direction. Between adjacent pillars 31 is provided a pocket 40 for housing the rollers 2. A plurality of the pocket 40 is disposed along the circumferential direction with intervals therebetween. In the following description, a direction along a center axis of the roller and cage assembly 1 is called "axial direction", a direction orthogonal to the center axis is called "radial direction", and a circumferential direction about the center axis is called "circumferential direction".

The pillars 31 of the present embodiment include a pillar center portion 32 positioned relatively on an inner side in the radial direction of its axial direction center region, a pair of pillar end portions 33 positioned relatively on outer sides in the radial direction of its axial direction end regions, and a pair of pillar inclined portions 34 positioned between the pillar center portion 32 and each of the pair of pillar end portions 33. The pair of pillar end portions 33 are provided in the axial direction with intervals therebetween, for the number of the pillar center portions 32 and the pair of pillar inclined portions 34. The width in the circumferential direction of the pillar inclined portion 34 is smaller than the width in the circumferential direction of the pillar center portion 32.

As particularly shown in FIGS. 3 and 4, the pillar end portions 33 protrude from end portions toward the pocket 40 in the circumferential direction, which end portions are on both sides in the axial direction of side walls 31a that configure the pocket 40, of the pillars 31. The pillar end portions 33 are inclined so that their length in the circumferential direction increases as it approaches from its inner diameter plane to its outer diameter plane. More specifically, the dimension in the circumferential direction of the pillar end portions 33 of the outer diameter plane of the pillars 31 is greater than the dimension in the circumferential direction of the pillar center portion 32 and the pillar inclined portions 34. The pillar end portions 33 are coupled to the annular portions 30 via the waist portions 11.

Particularly referring to FIGS. 2 and 3, each of the pair of pillar end portions 33 is provided with a protrusion 35 that protrudes toward the pocket 40 from the side wall surface that configures the pocket 40. The protrusion 35 contacts the rollers 2. The protrusion 35 is disposed on an outer diameter side than a pitch circle diameter PCD of the roller 2. The protrusion 35 functions as a roller stop portion (claw section) on the outer diameter side for preventing the roller 2 from falling to the outer diameter side. As described above, the pair of pillar end portions 33 is disposed with intervals provided in the axial direction; therefore, the pair of protrusions 35 are also provided having intervals in the axial direction. In the present embodiment, although omitted in illustration, the pillars 31 have a roller stop portion on an inner diameter side, which roller stop portion is disposed on the inner diameter side than the pitch circle diameter PCD of the roller 2.

Figure 5:
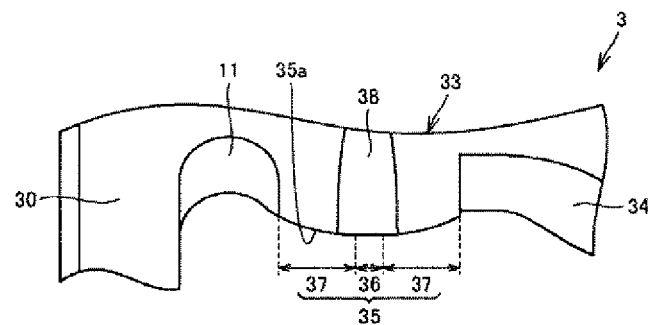
FIG. 5 is a partially enlarged view seen from the arrow V in FIG. 4.
Figure 6:
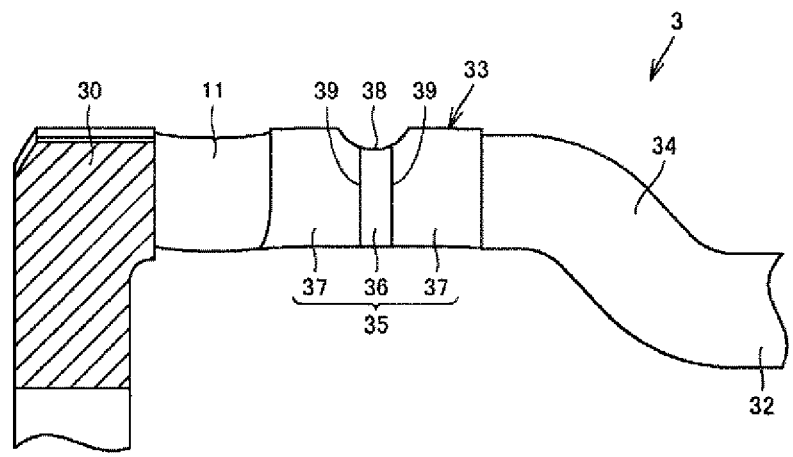
FIG. 6 is a partially enlarged view seen from the arrow VI in FIG. 4.

Further with reference to FIG. 5, among the protrusion 35, a plane 35a that faces the roller 2 in the circumferential direction has a first plane 36, and a second plane 37 extending from the first plane 36. In the present embodiment, the first plane 36 is a flat plane, and the second plane 37 is a curved plane. More specifically, one pair of the curved planes 37 is provided, and the flat plane 36 is sandwiched by the pair of curved planes 37. The pair of curved planes 37 each extend toward each end portion in the axial direction in a manner whose protruding length becomes reduced. Moreover, border sections where the flat plane 36 and the pair of curved planes 37 meet are smooth arc shapes. That is to say, the border sections 39 where the flat plane 36 and the pair of curved planes 37 meet have no edge and are round. In FIG. 6, for easy understanding, the border sections 39 have been illustrated.

Further with reference to FIG. 6, the outer diameter surface of the pillar end portions 33 are formed with a groove 38 for guiding the lubrication oil to the protrusion 35. The cross-sectional shape of the groove 38 is formed as a substantially semi-elliptical shape. Outer diameter surface side ends of the protrusion 35 and the groove 38 are in a positional relationship that intersect with each other. In other words, the flat plane 36 and curved planes 37 of the protrusion 35 are connected to the groove 38. The length of the groove 38 in the axial direction is longer than the length of the flat plane 36 in the axial direction. Moreover, as shown in FIGS. 2 and 3, one pair of the groove 38 is provided on the outer diameter surface of the pillar end portions 33 in the circumferential direction in an aligned manner. By having the groove 38 connected to the protrusion 35, it is possible to efficiently guide the lubrication oil to the protrusion 35.

Figure 7:
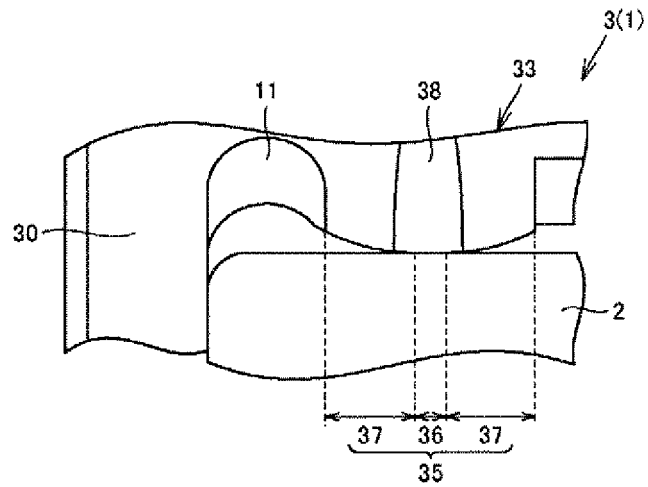
FIG. 7 is a partially enlarged view showing the roller and cage assembly according to Embodiment 1 of the present invention.
Figure 8:
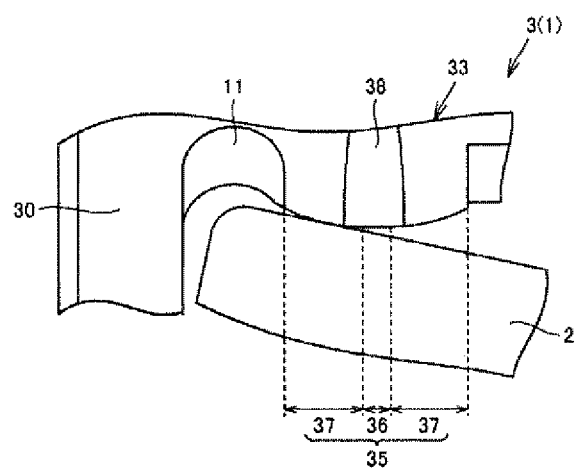
FIG. 8 is a partially enlarged view showing a state in which the roller shown in FIG. 7 is skewed.

Next describes, with reference to FIGS. 7 and 8, operations of the roller and cage assembly 1. As shown in FIG. 7, in a normal state in which the roller 2 contacts the protrusion 35 (when the roller 2 is not skewed), the roller 2 is supported by the flat plane 36. When the roller is not skewed, the roller and the cage are in contact by point contact if supporting the roller at a curved plane; this causes the roller and the cage to abrade, thus may cause peeling on the roller. In comparison, in the present embodiment, the roller 2 is supported by the flat plane 36. This will make the roller 2 be in surface contact with the flat plane 36, thus preventing the abrasion of the roller 2 and the cage 3.

Moreover, as shown in FIG. 8, when the roller 2 skews (when the roller 2 inclines against a cylindrical plane of the pinion shaft 105 with respect to the axial direction), the roller 2 will be supported by the curved plane 37 located on the annular portion 30 side. When the roller skews, if the roller is supported by the flat plane, the roller will contact an edge portion. This causes the roller and the cage to abrade and may thus cause peeling on the roller. In comparison, in the present embodiment, no edge portion is formed; therefore, the roller 2 will be supported by the curved plane 37, thus allowing for preventing abrasion on the roller 2 and the cage 3.

As such, according to the cage 3 of the roller and cage assembly 1 according to the present embodiment, the roller 2 can be supported by the flat plane 36 in the normal state (state in which the roller 2 is not skewed), and the roller 2 can be supported by the curved plane 37 in a state in which the roller 2 is skewed; it is thus possible to prevent the roller 2 from abrading and the cage 3 from abrading, in both the normal state and the skewed state. As a result, it is possible to prolong a lifetime of the roller and cage assembly 1.

In recent years, transmissions for automobiles are increasing in stages for fuel economy of the automobiles, and such transmissions tend to employ a planetary gear mechanism. Moreover, in addition to the increase in stages for further fuel economy, the transmissions for automobiles tend to reduce the amount of lubrication oil and to employ a lubrication oil with low viscosity. Therefore, even by using the roller and cage assembly 1 according to the present embodiment to the planetary gear mechanism for transmissions under an environment in which an oil film is difficult to be formed, it is possible to prolong a lifetime of the roller and cage assembly 1.

Moreover, by forming the groove 38, the lubrication oil that exists on a region surrounded by the outer periphery of the cage 3 and the outer peripheral surface of the pinion shaft 105 of the pinion gear 103 can be efficiently guided to the protrusions 35; this allows for efficiently feeding the lubrication oil to the roller 2. This accordingly can prevent the oil film on the outer peripheral surface of the roller 2 from breaking, even if the fed amount of the lubrication oil is reduced or the kinematic viscosity of the lubrication oil is reduced, for fuel economy.

As such, by the protrusions 35 having the first plane (flat plane) 36 and the second planes (curved planes) 37, and having the groove 38 being formed on the outer diameter planes of the pillar 31, it is possible to further prevent the abrasion of the protrusion 35 of the cage 3 and the roller 2, and can maintain the surface roughness of the roller 2 in a normal state. This thus causes no contact on minute protrusions in surface roughness shapes between the roller 2 and the protrusion 35, thus preventing minute peeling of the roller 2 and major peeling starting from the minute peeling. Accordingly, it is possible to prolong the lifetime of the roller and cage assembly 1.

One example of a manufacturing method of the roller and cage assembly 1 of the present embodiment will be described.

First, prepare a steel plate in strip form. As the material for the steel plate in strip form, for example low carbon steel, low alloy steel, or carburized steel may be used to ensure strength of the cage 3. The steel plate in strip form is press-roll formed so that its cross-sectional shape becomes M-shaped, and is subjected to a pocket opening processing for forming the pocket 40 that supports the roller 2. Next, on the pillar end portions 33 of the pillar 31, the protrusion 35 having the flat plane 36 and the pair of curved planes 37, and the groove 38 are formed. These processings are carried out by fixing the outer diameter surface of the pillar end portions 33 of the pillar 31 and deburring by pressing from the inner diameter surface side.

Thereafter, the steel plate in strip form is cut to have a length of the circumference of the cage 3, and the cut steel plate in strip form is rounded into a ring shape. Thereafter, the rounded steel plate in strip form is welded on both its ends, to manufacture the cage 3. This welding is performed by, for example, carbon gas arc welding, argon gas arc welding, or electric resistance welding. To the pocket 40 of the cage 3 manufactured as such, a plurality of the rollers 2 are incorporated, to manufacture the roller and cage assembly 1.

Accordingly, the processing of the flat plane 36 and the curved planes 37 of the protrusion 35 can use the same conventional facilities and can be manufactured in substantially the same speed as before; there is thus no need to introduce new facilities, and can be made to have the same manufacturing costs as the traditional metal cages. Moreover, by making the cage 3 made of metal, it is possible to hold down manufacturing costs as compared to a cage made of resin, which is inferior in manufacturing speed.

Embodiment 2

Figure 9:
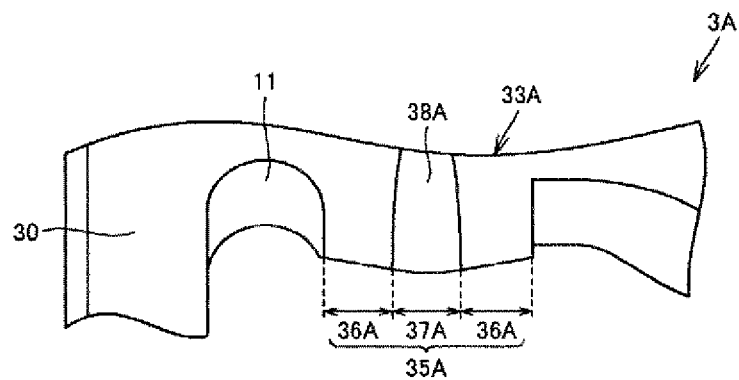
FIG. 9 is a view showing a cage in Embodiment 2 of the present invention, and is a view corresponding to FIG. 5.
Figure 10:
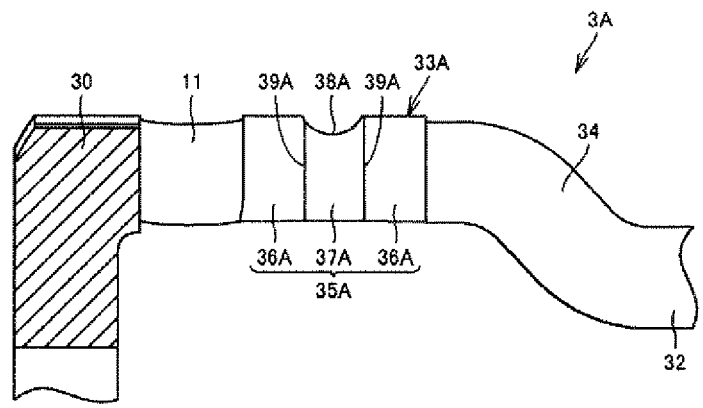
FIG. 10 is a view showing the cage in Embodiment 2 of the present invention, and is a view corresponding to FIG. 6.

With reference to FIGS. 9 and 10, a roller and cage assembly 1A according to Embodiment 2 will be described. The roller and cage assembly 1A according to Embodiment 2 basically includes the same configurations as the roller and cage assembly 1 of Embodiment 1, however differs mainly in the shapes of the protrusion 35A and the groove 38A. Moreover, the shape of a roller 2A being supported in a cage 3A is also different.

The roller and cage assembly 1A of the present embodiment is one used in the planetary gear mechanism 100 similarly to Embodiment 1. In particular, the roller and cage assembly 1A uses a helical gear as the pinion gear 103. By using the helical gear, a couple of forces will apply on the roller and cage assembly, thus making the roller in an environment easy to skew.

As shown in FIG. 9, in the protrusion 35A of the present embodiment, first planes 36A are flat planes that are inclined, namely, inclined flat planes, and a second plane 37A is a curved plane. The inclined flat planes 36A are disposed as a pair, and the curved plane 37A is sandwiched between the pair of the inclined flat planes 36A. The curved plane 37A has both of its ends in the axial direction connected to the inclined flat planes 36A, and the pair of inclined flat planes 36A extend approaching each end in the axial direction in a manner becoming reduced in protruding length. The length in the axial direction of the inclined flat planes 36A is substantially the same as the length in the axial direction of the curved plane 37A. Although border sections 39A where the pair of inclined flat planes 36A and the curved planes 37A meet have no edges and are round, in FIG. 10, the border sections 39A have been illustrated for easy understanding. Moreover, the groove 38A and the curved plane 37A of the protrusion 35A are connected, and the length in the axial direction of the groove 38A and the length in the axial direction of the curved plane 37A are substantially the same.

Figure 11:
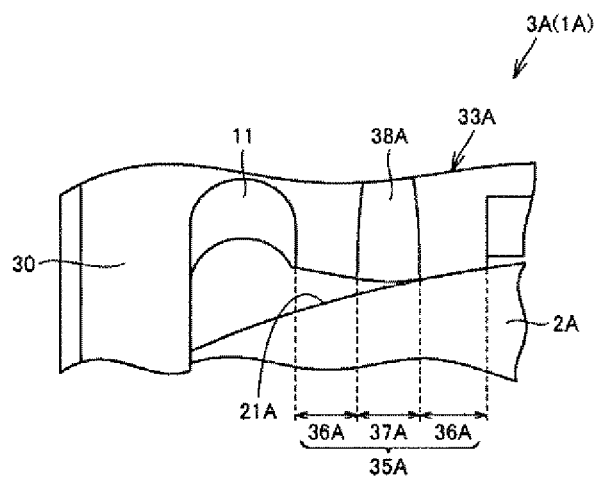
FIG. 11 is a view showing the cage according to Embodiment 2 of the present invention, and is a view corresponding to FIG. 7.

The roller 2A of the present embodiment has been crowned, as shown in FIG. 11, and crowning portions 21A are formed on both ends in its axial direction.

Figure 12:
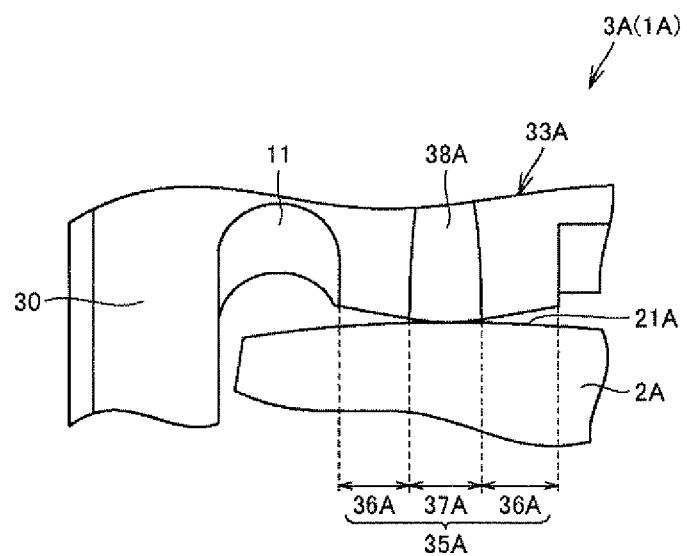
FIG. 12 is a view showing the cage according to Embodiment 2 of the present invention, and is a view corresponding to FIG. 8.

Next describes operations of the roller and cage assembly 1A, with reference to FIGS. 11 and 12. As shown in FIG. 11, in a normal state in which the roller 2A is supported by the protrusion 35A, the crowning portion 21A of the roller 2A is supported by the inclined flat plane 36A located on the pillar inclined portion 34 side. Moreover, as shown in FIG. 12, when the roller 2A skews, the roller 2A is supported by the curved plane 37A. As such, according to the cage 3A in the present embodiment, in a normal state, the roller 2A can be supported by the inclined flat plane 36A, and in the skewed state, the roller 2A can be supported by the curved plane 37A. Therefore, whether in the normal state or the skewed state, it is possible to prevent the abrasion of the roller 2A and the cage 3A. As a result, it is possible to prolong a lifetime of the roller and cage assembly 1A.

Embodiment 3

A roller and cage assembly 1B according to Embodiment 2 will be described with reference to FIGS. 13 and 14. As with Embodiment 2, the roller and cage assembly 1B according to Embodiment 3 also basically has the same configuration as the roller and cage assembly 1 of Embodiment 1, however differs mainly in the shapes of a protrusion 35B and a groove 38B. Moreover, the shape of the roller 2A supported by a cage 3B is as with Embodiment 2.

The roller and cage assembly 1B of the present embodiment is one used in the planetary gear mechanism 100 as with Embodiment 1, and in particular, uses a spur gear as the pinion gear 103 in such as a planetary gear mechanism for construction machines. By using the spur gear, no couple of forces are applied on the roller and cage assembly, thus making the roller 2A difficult to skew.

Figure 13:
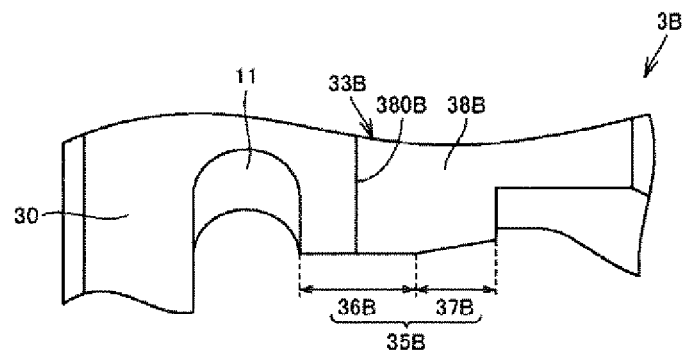
FIG. 13 is a view showing a cage in Embodiment 3 of the present invention, and is a view corresponding to FIG. 5.

As shown in FIG. 13, in the protrusion 35B of the present embodiment, a first plane 36B is a flat plane, and a second plane 37B is a flat plane that inclines against the first plane 36B, namely, is an inclined flat plane. The flat plane 36B is located on the annular portion 30 side, and the inclined flat plane 37B is located on the pillar inclined portion 34 side. The flat plane 36B is connected to the inclined flat plane 37B, and the inclined flat plane 37B extends from an edge of the flat plane 36B and approaching the pillar inclined portion 34. The length in the axial direction of the flat plane 36B is longer than the length in the axial direction of the inclined flat plane 37B. Although a border section 39B where the flat plane 36B and the inclined plane 37B meet has no edge and is round, in FIG. 14, the border section 39B has been illustrated for easy understanding.

Figure 14:
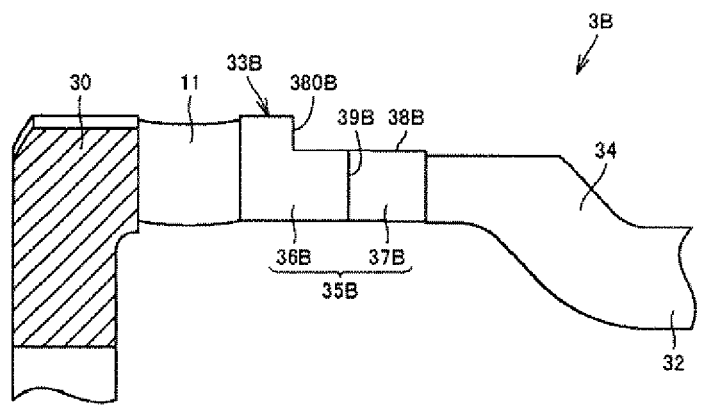
FIG. 14 is a view showing the cage in Embodiment 3 of the present invention, and is a view corresponding to FIG. 6.

As shown in FIG. 14, the groove 38B of the present embodiment continues from a middle position of the flat plane 36B of the pillar end portion 33B to the pillar inclined portion 34 in the axial direction, and is shaped concaved than the pillar end portion 33B. This allows for providing the groove 38B in a relatively broad region. Moreover, a perpendicular plane 380B extending in a direction perpendicular to the axial direction is provided between the groove 38B and the pillar end portion 33B. This allows for improving oil passage properties of the lubrication oil fed from the annular portion 30.

Figure 15:
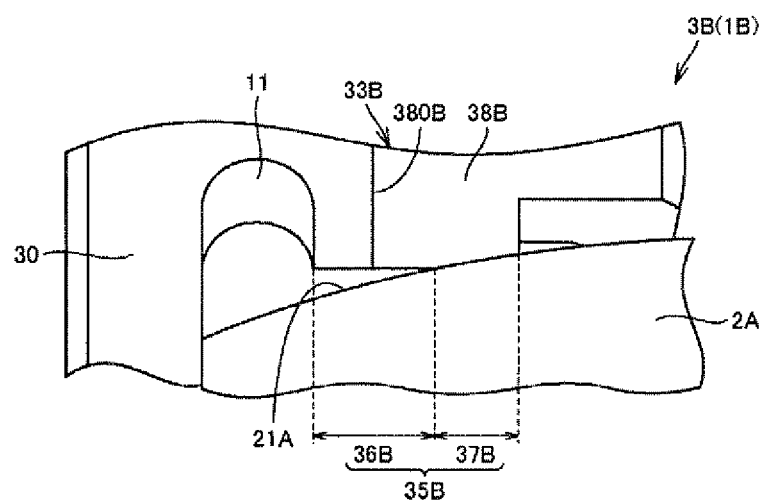
FIG. 15 is a view showing the cage according to Embodiment 3 of the present invention, and is a view corresponding to FIG. 7.

As shown in FIG. 15, in a normal state in which the roller 2A is supported by the protrusion 35B, the crowning portion 21A of the roller 2A will be supported by the inclined flat plane 37B. Accordingly, in the normal state, the roller 2A will be supported by the inclined flat plane 37B. This makes the roller 2A to surface contact with the inclined flat plane 37B, thus allowing for preventing the abrasion of the roller 2A and the cage 3B. Moreover, as described above, since the spur gear is used in the present embodiment, there is a low possibility that the roller 2A will skew and there is no need to form a curved plane on the protrusion 35. It is therefore possible to facilitate the processing of the protrusion 35B.

In the above embodiment, the grooves 38, 38A, 38B are provided for facilitating the guiding of the lubrication oil to the protrusions 35, 35A, 35B, however these are not limited to the shape in the above embodiments. The grooves are sufficient as long as at least a portion thereof continues to the pillar end portions 33, 33A, 33B, and there is no need for the entire groove to be located within the pillar end portions 33, 33A, 33B.

Moreover, in the above embodiment, the roller and cage assemblies 1, 1A, 1B are described as a roller and cage assembly of a single row. This however may be a roller and cage assembly with a plurality of rows.

Moreover, in the above embodiment, needle rollers are used as the rollers 2, 2A that are housed in the pocket 40. However, it is not limited to this, and for example may be a cylindrical roller, a stick roller or the like.

Moreover, in the above embodiment, the cages 3, 3A, 3B are so-called M-shaped cages having a plurality of annular portions. However, it is not limited to this, and may be so-called V-shaped cages that do not have the plurality of annular portions 30.

The embodiments disclosed in the present specification is only exemplary in all aspects, and should be considered not limitative. The scope of the present invention is shown not by the above descriptions but by the claims, and is intended to include meanings equivalent to the scope of the claims and all modifications within the scope.

REFERENCE SIGNS LIST 1, 1A, 1B Roller and cage assembly
2, 2A Roller
3, 3A, 3B Cage
21, 21A Crowning portion
30 Annular portion
31 Pillar
32 Pillar center portion
33, 33B Pillar end portion
34 Pillar inclined portion
35, 35A, 35B Protrusion
36, 36B Flat plane (First plane)
36A Inclined flat plane (First plane)
37, 37A Curved plane (Second plane)
37B Inclined flat plane (Second plane)
38, 38A, 38B Groove
39, 39A, 39B Border section
40 Pocket
100 Planetary gear mechanism
102 Sun gear
103 Pinion gear (planetary gear)
104 Carrier
105 Pinion shaft

The invention claimed is:

1. A roller and cage assembly comprising a roller and a cage, wherein
the cage has a plurality of annular portions, a plurality of pillars coupling the plurality of annular portions, and a pocket formed between adjacent ones of the pillars,
the pillars include a pillar center portion located in a center region in an axial direction and relatively on an inner side in a radial direction, a pair of pillar end portions located on end regions in the axial direction and relatively on an outer side in the radial direction, and a pair of pillar inclined portions located between the pillar center portion and the pair of pillar end portions,
the pair of pillar end portions include a protrusion protruding from a side wall surface toward the pocket and contacting the roller, the side wall surface configuring the pocket,
within the protrusion, roller holding planes face the roller in a circumferential direction and hold the roller, the roller holding planes comprising a first plane, and a second plane connecting to the first plane,
the first plane being a flat plane, and
the second plane being a curved plane, or a flat plane inclined against the first plane.

2. The roller and cage assembly according to claim 1, wherein
a border section where the first plane and the second plane meet is of a smooth arc form.

3. The roller and cage assembly according to claim 1, wherein
the pillar end portions have a groove formed on an outer radial plane thereof configured to guide lubrication oil to the protrusion.

4. The roller and cage assembly according to claim 3, wherein a side end portion on the outer radial plane of the protrusion and the groove are in a positional relationship intersecting with each other.

5. The roller and cage assembly according to claim 1, wherein
the roller has a crowning portion formed on each end thereof in the axial direction,
the protrusion is provided having intervals therebetween in the axial direction, and
the crowning portion is supported by an inclined flat plane of the first plane or the second plane.

6. A planetary gear support structure comprising: an internal gear; a sun gear disposed in a center of the internal gear; a plurality of planetary gears configured to mesh with the internal gear and the sun gear; and a carrier configured to support the planetary gear, wherein in the planetary gear support structure of a planetary gear mechanism in which the planetary gear is supported freely rotatable on a pinion shaft provided to the carrier via a rolling-element bearing, the rolling-element bearing being a roller and cage assembly according to claim 1.

* * * * *